No. 748,623. PATENTED JAN. 5, 1904.
H. E. KREUTER.
REVERSIBLE PLOW.
APPLICATION FILED JULY 20, 1903.
NO MODEL.

Witnesses
C. H. Walker
Geo. E. Tew

Inventor
Hugh E. Kreuter
By Milo B. Stevens & Co.
Attorneys

No. 748,623.

Patented January 5, 1904.

UNITED STATES PATENT OFFICE.

HUGH E. KREUTER, OF NICKELPLATE, INDIANA.

REVERSIBLE PLOW.

SPECIFICATION forming part of Letters Patent No. 748,623, dated January 5, 1904.

Application filed July 20, 1903. Serial No. 166,313. (No model.)

*To all whom it may concern:*

Be it known that I, HUGH E. KREUTER, a citizen of the United States, residing at Nickelplate, in the county of Starke and State of Indiana, have invented new and useful Improvements in Reversible Plows, of which the following is a specification.

This invention relates particularly to reversible gang-plows; and the object of the invention is to provide a construction whereby a gang of plows may be reversed and run from one side of the field to the other without turning. The construction is particularly applicable to a gang of plows drawn by steam or other engines at the sides of the field through connecting-tackle.

The invention is characterized principally by a frame carrying gangs of plows on both sides, which frame may be turned over at the end of the furrow, and thereby reversed, the tackle connections extending in both directions from the plow across the field to draw the same in both ways.

Figure 1:
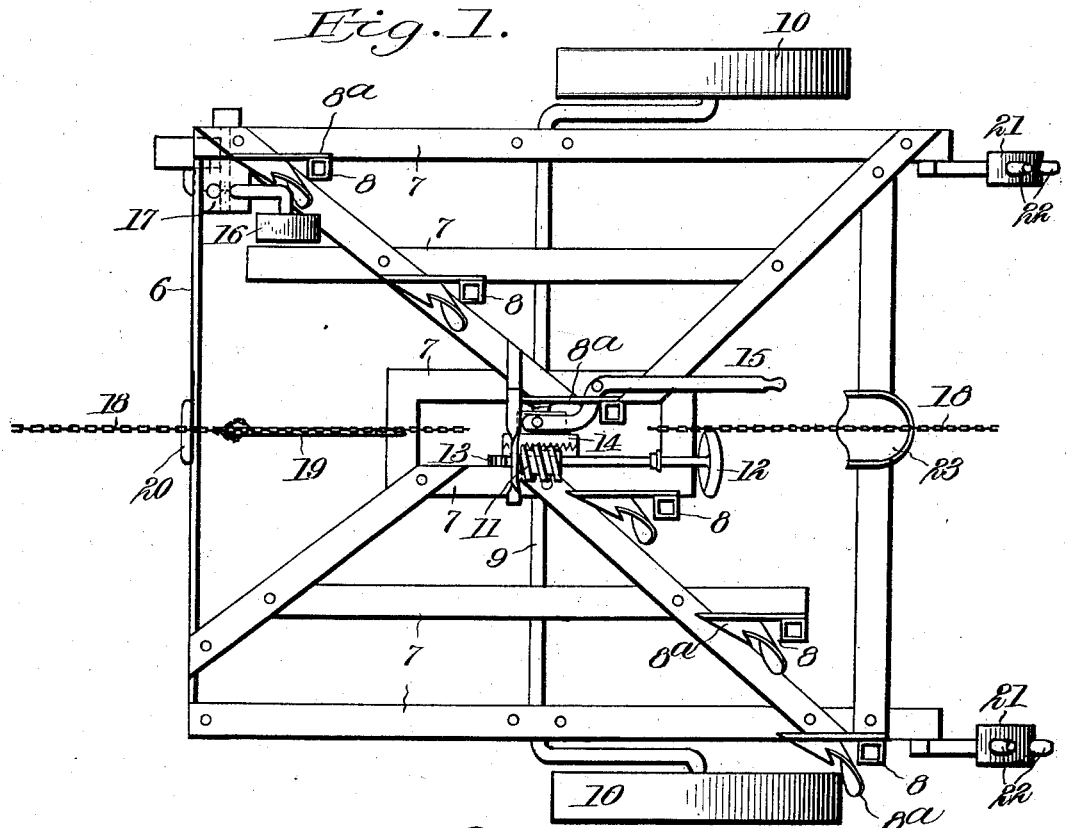
Figure 2:
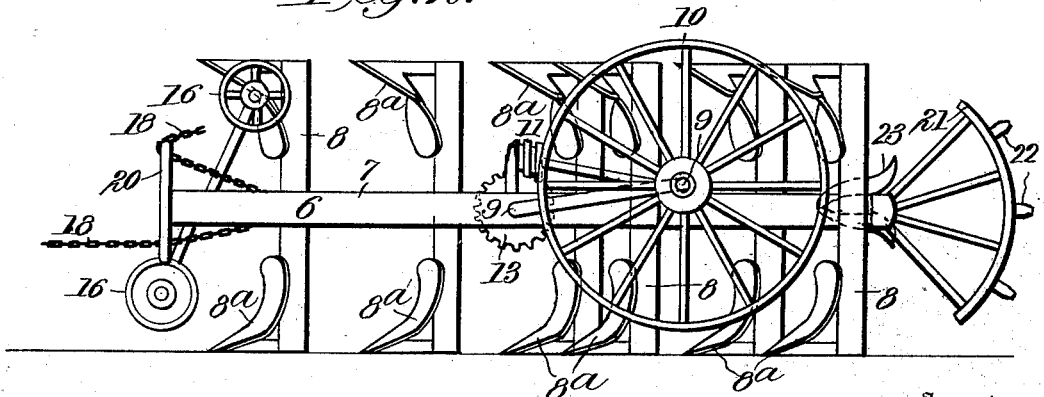

In the accompanying drawings, Figure 1 is a top plan view of the plow, and Fig. 2 is a side elevation thereof.

Referring specifically to the drawings, 6 indicates a frame containing a number of plow-beams 7, properly connected and braced to give the requisite rigidity and strength. The frame is substantially square, and the plow-standards 8 are alined diagonally across the same. The standards are attached to the respective beams and extend above and below the same, and each standard carries two plows $8^a$, one on each end, the throw of the plows being opposite. The frame is mounted upon a crank-axle 9, carrying the wheels 10, and by means of the axle the depth of the cut of the plows is gaged or the plows lifted from the land. The turn of the axle is effected by means of worm-gearing comprising a worm 11, turned by a hand-wheel 12 and in mesh with a gear-wheel 13, loose on the axle. The gear-wheel is adapted to be engaged by a clutch 14, which is keyed on the axle, but is slidable lengthwise thereon by the controlling-lever 15. At one front corner of the frame are adjustable depth-wheels 16. These extend in opposite directions to support the frame in both positions, and the stems of their axles are held in a clamp 17, whereby they may be raised or lowered to the gage desired. The draft-chains 18 are connected to a link 19 at the front of the middle portion of the frame and extend thence through loops 20, carried by the front bar of the frame, and one chain is bent backwardly over the loop and extends above the plow to the opposite side of the field from the other chain. The loops project high enough to give sufficient purchase on the draft-ropes to turn the plow over at the end of the furrow. At the rear ends of the side frames of the plow immediately behind the main wheels are segments 21, which have pins 22 projecting therefrom. These segments form the supports upon which the plow turns over when it is reversed. The operator's seats are indicated at 23.

In operation when drawn in either direction the front wheel 16 follows the furrow and the plows take in succession, as is customary in gang-plows. When the end of the furrow is reached, the plows are drawn out by turning the crank-axle and lifting the frame. This tilts the front end of the frame up and the back end of the frame down, so that the segments come in contact with the ground. Then the rearwardly-extending chain or rope is pulled, which has the effect of backing the segments into the ground and lifting the whole machine and turning the same thereon. The opposite ropes are held sufficiently taut to prevent slamming, and the plow is turned over and lowered on the other side, after which the plow may be drawn in the opposite direction. The controlling wheel and lever are accessible to the operator from either seat.

It will be seen that the plow standards and beams are rigid at all times with the frame, whereby the weakness of loose standards is avoided.

What I claim as new, and desire to secure by Letters Patent, is—

1. The combination, in a reversible plow, of a wheeled frame, plows extending oppositely on both sides thereof, segments at the rear end of the frame adapted to rest on the ground and support the plow when reversed, and means to turn the frame over, substantially as described.

2. The combination in a reversible plow, of a frame, plows on opposite sides thereof, a cranked axle and wheels supporting the frame, means to turn the axle to raise or lower the frame, and segments at the rear end of the frame, adapted to engage the ground and support the plow while it is being turned over.

3. The combination with a plow-frame having plows on opposite sides thereof, and a support at the rear end on which the frame may be turned over lengthwise, of forwardly and rearwardly extending draft connections attached to the front of the frame, substantially as described.

In testimony whereof I have signed my name to this specification in the presence of two subscribing witnesses.

HUGH E. KREUTER.

Witnesses:
HUGH KREUTER, Jr.,
MAT. H. BONER.